3,404,111
EMULSION POLYMERIZATION IN THE PRESENCE OF A HYDROCARBON LATEX EXTENDER OIL
Ralph E. McNay, Houston, Tex., assignor to Ashland Oil & Refining Company, Houston, Tex., a corporation of Kentucky
No Drawing. Filed Apr. 1, 1965, Ser. No. 444,844
16 Claims. (Cl. 260—23.7)

The present invention relates to the polymerization of unsaturated organic compounds, particularly unsaturated organic compounds which are capable of undergoing an addition polymerization to form high molecular weight polymers, and a polymerization reaction medium therefor. In one of its more specific aspects, the present invention relates to the polymerization of aliphatic conjugated diene hydrocarbons, including, substituted derivatives thereof, either alone or in admixture with monomers which are copolymerizable therewith, to form long chain polymers suitable for use as synthetic rubbers. In a still more specific aspect, the present invention relates to the polymerization of a conjugated diene hydrocarbon and a monomer copolymerizable therewith in an aqueous emulsion of an inert adjuvant material.

In the production of synthetic elastomers, a conjugated diolefin, such as butadiene, isoprene, chloroprene, and the like is polymerized, either alone or in admixture with a monomer copolymerizable therewith, such as, styrene, alphamethyl, styrene, acrylonitrile, methacrylonitrile, methyl methacrylate, or other compounds containing a vinyl group. In the widely used emulsion polymerization technique, the monomers are dispersed in water containing a suitable emulsifying agent, and a polymerization catalyst is added. The emulsion is maintained at a suitable temperature and agitated by stirring, or other means, until the desired degree of conversion has been attained, after which the reaction is short-stopped. The latex solution is then treated with an antioxidant and the polymer is coagulated and then cooled and dried. Numerous recipes have been developed and many variations in operating conditions, such as, varying the reaction temperature, the rate of agitation, the ratio of reactants, etc., have been developed. Such variations are practiced and selected recipes utilized in order to influence the quality of the end product and its properties.

It has also been a widespread practice to add to such polymeric materials various inert adjuvant materials, such as extender oils, resins, waxes, and the like. The use of oil-type extenders is most prevalent. These extender oils serve to lower the internal viscosity of the material, providing a rubber of good elasticity and, at the same time, considerably lowering the cost of the end product.

Heretofore, the above-outlined procedure for the production of polymeric materials has met with numerous difficulties when employed to produce polymers of high molecular weight. The most serious of these difficulties has been excessive cross-linking between polymer units which in turn leads to the formation of gel-type products having undesirable properties for use in the production of most types of synthetic rubber. Products containing high percentages of these gel-type products are extremely difficult to process, depending upon the degree of gelation, since mixing operations become more difficult; and, in addition, the quality of the final vulcanized product is lowered. Specifically, the product has decreased tensile strength, increased modulus of elasticity and decreased cut growth resistance, as well as other poor qualities.

In addition to the previously discussed problems, additional problems arise when one wishes to add an adjuvant material to the polymer. Normally, extender oils or other inert adjuvant materials are added to the completed latex just prior to coagulation. While the individual polymer particles are suspended or dispersed in the extender oil in this system, it has been recognized that the oil is only on the surface of the particles and intimate mixing of the oil and polymer particles can be achieved only after considerable milling.

Oil-extended polymers prepared by previous techniques have also been found lacking in elasticity which in turn leads to later processing difficulties. For example, when a piece of raw oil-extended polymer is pulled apart it will string out in the same manner as a piece of chewing gum but it will have little or no tendency to return to its original shape. This poor elasticity makes the polymer difficult to process and contributes to poor wear qualities when the polymer is incorporated in a finished product such as tires.

It is therefore an object of the present invention to provide an improved method of emulsion polymerization of organic compounds, and particularly unsaturated organic compounds. Another object of the present invention is to provide an improved method of emulsion polymerization of aliphatic conjugated diene hydrocarbons with a monomer which is copolymerizable therewith. A still further object of the present invention is to provide an improved method of emulsion polymerization of unsaturated organic compounds in the presence of an adjuvant material. Another and further object of the present invention is to provide an improved method of emulsion polymerization of diene hydrocarbons in the presence of an adjuvant material. Still another object of the present invention is to provide an improved method for the emulsion polymerization of unsaturated organic compounds in the presence of extender oils. Yet another object of the present invention is to provide an improved method of emulsion polymerization of unsaturated organic compounds wherein products having a reduced gel content are obtained. A further object of the present invention is to provide an improved method of emulsion polymerization of unsaturated organic compounds wherein polymers of high molecular weight are produced with a minimum of cross-linked polymers. Another object of the present invention is to provide an improved method of emulsion polymerization of unsaturated organic compounds wherein products of high Mooney value are obtained with substantially reduced gel contents. Still another object of the present invention is to provide an improved method of emulsion polymerization of unsaturated hydrocarbons wherein products of high Mooney value are obtained with a minimum of cross-linked polymers. A further object of the present invention is to provide an improved method of emulsion polymerization of unsaturated hydrocarbons wherein high molecular weight polymers containing an adjuvant material are obtained. Another object of the present invention is to provide an improved method of emulsion polymerization of unsaturated hydrocarbons wherein high molecular weight polymers containing extender oils are produced. Yet another object of the present invention is to provide an improved method of emulsion polymerization of unsaturated hydrocarbons wherein polymers of improved properties are obtained. A still further object of the present invention is to provide an improved method of emulsion polymerization wherein polymers of improved elasticity are produced. Another and further object of the present invention is to provide an improved method of emulsion polymerization wherein polymers which can be more easily processed are formed. An additional object of the present invention is to provide and improved method of emulsion polymerization wherein the polymers obtained contribute significantly to the wearability of the final product. These and other objects and advantages of the present invention will be apparent from the detailed description which follows.

Briefly, in accordance with the present invention it has been found that high molecular weight polymers having substantially reduced gel content can be produced from organic compounds and preferably unsaturated organic compounds, by forming an emulsion of an inert adjuvant material, which is miscible with the unsaturated organic reactant and the polymers produced therefrom, in the presence of an emulsifying composition; mixing this polymerization reaction medium with at least one unsaturated organic compound and subjecting the mixture to polymerization under emulsion polymerization conditions and in the presence of conventional polymerization modifying materials. It has also been found that improved dispersion of an inert adjuvant material in polymers formed by the emulsion polymerization of unsaturated organic compounds can be obtained by first forming an emulsion of the inert adjuvant material, thereafter adding this emulsion to an organic unsaturated compound and subjecting the mixture to polymerization under emulsion polymerization conditions and in the presence of conventional polymerization modifying compositions.

Unsaturated organic compounds suitable for use in accordance with the present invention include any of the well-known monomer materials heretofore employed in addition polymerization reactions. Preferably, the monomeric material consists wholly or in part of a conjugated diene hydrocarbon. Thus, the monomeric material may be butadiene, such as butadiene-1,3 or its homologs and analogs; for example, isoprene, 1-3-dimethyl butadiene-1, 3; piperylene, chloroprene and the like, by itself, a mixture of such conjugated dienes or a mixture containing one or more of such dienes and one or more other unsaturated compounds copolymerizable therewith. Such other unsaturated compounds, called called comonomers, are in general unsaturated organic compounds containing the polymerizable structure

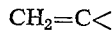

$$CH_2=C<$$

where at least one of the disengaged or unattached valencies is connected to a electro-active group, that is a group which substantially increases the electrical dissmmetry or polar character of the compound. Among such comonomers there may be mentioned aryl olefins such as styrene, vinyl naphthalene and their chloro or alkoxy substituted derivatives; alpha methylene carboxylic acids and their esters, nitriles, amides and the like such as acrylic acid, methacrylic acid, methyl acrylate, methyl methacrylate, ethyl methacrylate, methyl ethacrylate, butyl acrylate, isobutyl methacrylate, acrylonitrile, methacrylonitrile, ethacrylonitrile, acryl amide, methacryl amide and the like and other unsaturated comonomers such as vinylidene chloride, methyl vinyl ether, methyl vinyl ketone, vinyl acetate, isobutylene, vinyl acetylene, vinyl ethinyl ethyl carbinol, and various other unsaturated hydrocarbons, esters, ketones, acids, ethers, alcohols and the like.

As previously pointed out, the first step of the process of the present invention involves adding an inert adjuvant material to the monomeric material as an aqueous emulsion of the adjuvant material. The adjuvant material may include any of the well-known materials normally employed as additives in compounding synthetic rubbers. Accordingly, the adjuvant material may include rubber extender oils, waxes, resins and the like. Rubber extender oils include any of the heavy hydrocarbon oils of petroleum origin and, in particular, aromatic and naphthenic hydrocarbon oils. However, paraffinic or naphthenic-type oils are also suitable for use in the present invention. The adjuvant material referred to herein is inert in the sense that it will not enter into the polymerization reaction, but simply acts as a diluent or carrier material during the reaction and is ultimately physically incorporated in the end product. This definition of "inert adjuvant" materials, therefore, includes any non-gaseous adjuvant material, normally compounded with latex materials, which is non-volatile under operating conditions of the polymerization reaction, and during subsequent processing of the polymer, which does not itself polymerize under operation conditions and which may be dispersed in an aqueous emulsion.

Emulsifying agents suitable for use in the practice of the present invention include any of the well-known emulsifiers employed in the conduct of a conventional emulsion polymerization reaction. Such emulsifying agents, therefore, include any of the well-known fatty acid soaps, rosin acid soaps, sulfonates derived from petroleum, etc. For example, emulsifying agents suitable for use in the present invention include potassium laurate, potassium oleate, rosin acid soaps, such as sodium or potassium salts of disproportionated rosin acids, sodium lauryl sulfate, mixtures of a fatty acid and rosin acid soaps, or salts of alkyl aromatic sulfonic acids, such as, sodium salt of dodecylbenzene sulfonic acid, sodium alkyl naphthalene sulfonates, etc.

The amount and kind of emulsifier used to obtain optimum results is somewhat dependent upon the particular emulsifying recipe used. In general, however, emulsifiers in the amount of about 0.3 to 5 parts by weight to 100 parts of monomer material is sufficient, the selection of the best amount for any given recipe being within the skill of the art.

In the formation of the aqueous emulsion of adjuvant material, all or part of the emulsifying composition to be used in the conduct of the polymerization reaction is used. It has been found highly beneficial to the conduct of the present invention that the adjuvant material be pre-emulsified by the in situ soap formation process commonly used in emulsifying heavy oils. Also, in the preferred techniques, it has been found that styrene or other unsaturated compounds, which are to be copolymerized with a monomer, such as, butadiene, should be mixed with the adjuvant material and pre-emulsified therewith prior to their addition to the monomer or monomers.

The aqueous emulsion of adjuvant material, or the aqueous emulsion of adjuvant material plus styrene, is then mixed with the primary monomer to be utilized in the polymerization reaction. In the preferred technique referred to, this monomer material is butadiene. Where butadiene-styrene copolymers are to be formed, the amount of styrene may vary. For example, about 1 to 28 parts by weight of styrene may be utilized with about 72 to 99 parts by weight of butadiene, all in accordance with established techniques.

The amounts of adjuvant material are also determined in accordance with techniques known to those skilled in the art. It has been found that rubber extender oils can be used in amounts as high as 50 parts by weight, or higher. However, ten to twenty parts have been found to be preferable.

This mixture of aqueous emulsion of the adjuvant material and the monomer material is then subjected to a conventional emulsion polymerization operation in accordance with well-known techniques and in the presence of emulsion polymerization controlling compositions. Suitable polymerization materials are: polymerization initiators, including hydrogen peroxide, para methane hydroperoxide, potassium persulfate, sodium perborate, potassium percarbonate and the like, azo type polymerization initiators such as diazo amino benzene and dipotassium diazo methane disulfonate and the like and other initiators such as sulfur dioxide; polymerization catalysts or accelerators such as the heavy metals systems, including, ferrous sulfate and a pyrophosphate of an alkali metal, such as tri potassium phosphate; polymerization modifiers, such as primary, secondary or tertiary mercaptans containing 8 to 16 carbon atoms, such as tert dodecylmercaptan, commonly known as "Sulfole," dialkyl dixanthogens, diaryl disulfides and other organic compounds which increase the solubility and plasticity of the polymers formed in their presence; and other substances added for some special purpose. In practice, the ingredients, that is, the mixture of the aqueous emulsion of adjuvant material and the monomer, the catalyst and other components of the polymerization recipe, are placed in a closed pressure-resistant reaction vessel. Polymerization is carried out between —40 and 212° F., preferably from —4 to 125° F. and at any suitable pressure, preferably the pressure of the reaction mixture, although greater pressures can be used. The polymerization can be carried out batch-wise or in a continuous or semi-continuous manner. The polymerization may be short-stopped, at 60 to 90% conversion of monomer, by the addition of conventional inhibitors, such as, hydroquinone, catechol, aniline, alpha-naphthylamine, sodium salts of ethylene diamine tetra acetic acid, etc. The latex may then be coagulated by conventional means.

The following is a standard recipe for latex, which has been utilized for production of polymers in accordance with the present invention. When utilizing this particular recipe, reaction temperatures of about 42° F. are utilized and the conversion is carried to 60 to 90% conversion.

TABLE I

| | Parts by weight |
|---|---|
| Butadine | 72.0 to 100 |
| Styrene | 28.0 to 0 |
| Para methane hydroperoxide | .09 |
| Tert dodecylmercaptan | .06 to .20 |
| Fatty acid soap | 2.14 |
| Potassium salt of disproportionated rosin | 2.25 |
| Tri potassium phosphate | .44 |
| Sodium alkyl naphthalene sulfonate | 0.15 |
| NaOH | .045 |
| Rubber processing oil | 5 to 50 |
| FeSO$_4$7H$_2$O | .015 |
| Sodium salt of ethylene diamine tetra acetic acid | .04 |
| Sodium formaldehyde sulfoxylate | .08 |
| Water | 200 |

While it is not intended to limit the present invention to any particular theory, it is believed that the following explains the unexpected results obtained when utilizing a preformed emulsion of adjuvant material in an emulsion polymerization reaction. Normally, as the Mooney value of a polymer increases the molecular weight or chain length of the polymer increases. In emulsion polymerization, the polymer chains start growing in the soap micelle and eventually become tiny, discrete bundles of polymer chains surrounded by a protective layer of soap. This principle is the same for all Mooney levels of polymer, but with the low Mooney, non-adjuvant containing polymers, the chains are relatively short, and when the protective soap layer is broken, the individual polymer chains move about readily with relatively little force. On the other hand, when the chain length increases, the chain is confined within the protective layer of soap, so that, as the many chains present become very long, non-cross-link polymers form a highly entwined mass of chains. When the protective soap layer is broken, the individual chains are not free to move. The bundle remains relatively intact. Visualizing the high molecular weight polymer as a bundle of highly entwined chains, the following possible problems exist. While the polymer chains are growing they are surrounded and separated to some extent by unreacted monomers. As the reaction proceeds, the polymer chains increase in length and the amount of monomer decreases until there is relatively little monomer at conversion levels of 60% or greater. This permits close physical contact of the polymer chains and encourages cross-linking of the polymer chains at the point of contact. It is believed therefore that the presence of an inert adjuvant material, such as, rubber extender oil, in the monomer mixture serves to physically separate the polymer chains and aid in the prevention of cross-linking. In addition, it is believed that the inert adjuvant material is more readily and more evenly dispersed when present as an emulsion in admixture with the monomer material. When the latex product is stripped of all the unreacted monomer, the polymer chains within each particle are in full contact with one another, but because of the dispersion of the oil before the polymerization reaction, the polymer-oil uniformity is greatly improved. If, on the other hand, the oil is coagulated with the latex, in accordance with the standard practice, the oil surrounds each large particle of polymer, but the individual chains tend to stick together and exclude the oil, thus, islands of polymer are present in a sea of oil. As an ultimate result, the rubber produced from the latex has a tendency to seep or bleed oil in use.

The "Mooney value," previously referred to, relates to the numerical value of "Mooney viscosity" or, as sometimes termed, "Mooney plasticity." This measurement is a standard test in the rubber industry and was first described by Mooney in Industrial and Engineering Chemistry, Analytical Edition, vol. 6, pp. 147–151 (1934), and is a measure of the shearing force, at a specified temperature and after a definite period of shearing, obtained when a roughened disc is rotated within a sample of raw polymer held on a surrounding stator. The Mooney viscosimeter is, of course, a standard item of equipment also. A "high" Mooney value as used herein means above about 140.

When coagulated and baled rubber is utilized for the test, 250 grams of the test material are passed through a mill, having a temperature of 110° to 130° F. and a distance between rollers of 0.055 inch ±0.005 inch, ten times. In passes two to nine, the sample is doubled upon itself. The mass is then aged for at least 30 minutes and, thereafter, the Mooney viscosity is determined by observing the lowest value during the period from 3 minutes and 45 seconds to 4 minutes, exclusive of a 1 minute warm-up period.

When the sample to be tested is in its latex form, 350 ml. of the latex is placed in a 4 liter beaker and steam is passed through the latex for 1 minute, or until the foam subsides. Steam is, thereafter, passed through the latex rapidly for 9 minutes and then turned off. 350 ml. of methanol solution containing PBNA and acid are added to a Blendal stirrer. The stripped latex is added to the methanol solution at a uniform rate, which should require from 10 to 20 seconds for the 350 ml. sample. Stirring is continued for an additional 2 minutes after all the latex has been added. The serum is then filtered off the coagulum through a cheesecloth or plastic screen and the crumb is squeezed into a ball by hand and excess liquid removed with a Famco Arbor hand press. The crumb is then placed between aluminum sheets 0.010 to 0.015 inch in thickness and the sheets are inserted between 6 inch x 6 inch plates heated to 292° F. in a Carver press. The press is closed until the sample is ¼ inch thick. The crumb is dried for 9 minutes and then removed from the heating plates and allowed to cool at room temperature for 2 minutes. Following this, the rubber is removed from the aluminum sheets and mill-massed 10 times with the rolls 0.055 inch apart at room temperature, approximately 25° C. The Mooney viscosity is then determined by observing the lowest value during the period of 3 minutes and 45 seconds to 4 minutes, exclusive of the 1 minute warm-up period.

Also, as previously indicated, the Mooney viscosity or Mooney value is a measure of the chain length or molecular weight of the polymer. In the recipe referred to previously, the tert dodecylmercaptan is a polymerization modifier utilized to control the molecular weight of the final polymer. As the amount of modifier is reduced, the molecular weight increases and there is a higher probability of the formation of undesirable gel. In addition, as the percent conversion of monomores is increased, the molecular weight is increased and again the probability of increased gel formation is greater.

The formation of gel or the percent gel developed in a polymer product can be measured by a standard test utilizing a baled rubber sample, as is, or polymer crumb. If crumb is used, a small portion is pressed at a pressure comparable to that normally used in a baler for 1 minute. If milling is desired, the final sample is sheeted at approximately 0.055 inch. A portion of the sample is cut into cubes about $\frac{1}{16}$ inch in size and exactly 0.2000 gram is weighed out. Care should be taken that all equipment utilized is clean. The cubes are placed on screens and the screens placed in a glass container. The stopcock of the container is lightly greased with suitable stopcock grease and 100 ml. of benzene is drawn off into the container allowing the liquid to flow down the sides of the container to thereby prevent air pockets and to lessen the agitation of the samples. A top is placed on the container and the container is set aside where it will not be disturbed for 24 hours. After 24 hours the top of the cylinder is removed and the benzene is drawn off through the bottom valve into a 250 ml. Erlenmeyer flask. If any discoloration is present, the sample is filtered through a fritted glass filter. 50 ml. of the extract are drawn off into a weighed evaporation dish and evaporated to dryness in a heated water bath followed by 15 minutes in a 105° C. oven. The evaporation dish is then weighed after cooling. The percent gel is then obtained by the following formula: percent gel=100–1000A where A equals the weight of dry material in 50 cc. of the extract.

The following examples of polymers prepared in accordance with standard procedures and in accordance with the present invention clearly indicate the distinct advantage of the present process in reducing the percent gel formed in a final polymer material. In addition to the percent gel, the table lists the percent of butadiene monomer utilized, with the remainder of the reactants, if any, being styrene. The type and relative portions of adjuvant material utilized, the relative amount of Sulfole utilized and the percent conversion of monomer are also listed:

TABLE II

| Percent butadiene | Adjuvant material | Parts adjuvant | Parts sulfole | Percent conversion | Percent gel. |
|---|---|---|---|---|---|
| 72 | None | | 0.05 | 60 | 24.9 |
| 72 | Oil | 15 | 0.00 | 80 | 0.0 |
| 72 | Oil | 15 | 0.05 | 80 | 1.0 |
| 100 | Oil | 15 | 0.05 | 80 | 0.0 |

It is to be observed that where extender oil was pre-emulsified and added to the butadiene monomer, in accordance with the present invention, a very striking reduction in the percent gel occurred, even though, in some cases, no mercaptan was used as a chain transfer agent. The resultant polymer also had improved properties which contribute significantly to the ease of subsequent processing and the quality of products made from the polymer. Specifically, the polymer product can be extended to form a thin film and when released returns quickly to nearly its original form. This outstanding quality of elasticity aids in subsequent processing of the polymer and improves the wear characteristics of products, such as tires, into which the polymer is made.

Having described the invention of the present application in considerable detail and illustrated its practice by specific examples utilizing specific materials and procedures, it is to be recognized that one skilled in the art will be aware of numerous substitutions of materials, changes in conditions and changes in procedures which will in no way affect the operation of the technique of the present invention. Accordingly, it is to be recognized that such variations or modifications are to be considered as though incorporated herein and the present invention is to be limited only in accordance with the appended claims.

I claim:
1. A method of producing latex by emulsion polymerization, comprising, forming an emulsion of water and a hydrocarbon latex extender oil in the presence of an emulsifying composition, mixing said emulsion with at least one polymerizable material, selected from the group consisting of conjugated dienes and conjugated dienes with at least one monomer copolymerizable therewith and subjecting the mixture of emulsion and polymerizable material to polymerization in the presence of a polymerization modifying composition and under emulsion polymerization conditions.

2. A method in accordance with claim 1 wherein the latex extender oil is of petroleum origin.

3. A method in accordance with claim 1 wherein the latex extender oil is an aromatic hydrocarbon oil.

4. A method in accordance with claim 1 wherein a major portion of the emulsifier composition to be ultimately utilized in the emulsion polymerization reaction is utilized in the formation of the emulsion of water and extender oil.

5. A method in accordance with claim 1 wherein substantially all of the emulsifier composition to be utilized ultimately in the polymerization reaction is utilized in the formation of the emulsion of water and extender oil.

6. A method in accordance with claim 1 wherein the polymerizable material is butadiene.

7. A method in accordance with claim 1 wherein the polymerizable material includes styrene and butadiene.

8. A method in accordance with claim 7 wherein the styrene is used to dissolve the extender oil prior to the formation of the emulsion with water and the butadiene is thereafter mixed with the emulsion.

9. A method in accordance with claim 1 wherein the emulsifying composition includes a fatty acid soap and a rosin acid soap.

10. A method in accordance with claim 1 wherein the following ingredients are utilized in approximately the proportions, in parts by weight, specified:

| | |
|---|---|
| Butadiene | 72.0 to 100 |
| Styrene | 28.0 to 0 |
| Para menthane hydroperoxide | .09 |
| Tert dodecylmercaptan | .00 to .20 |
| Fatty acid soap | 2.14 |
| Potassium salt of disproportionated rosin | 2.25 |
| Tri potassium phosphate | .44 |
| Sodium alkyl naphthalene sulfonate | 0.15 |
| NaOH | .045 |
| Hydrocarbon latex extender oil | 5 to 50 |
| FeSO$_4$ 7H$_2$O | .015 |
| Sodium salt of ethylene diamine tetra acetic acid | .04 |
| Sodium formaldehye sulfoxylate | .08 |
| Water | 200 |

11. A method in accordance with claim 10 wherein the extender oil is of petroleum origin.

12. A method in accordance with claim 10 wherein the latex extender oil is an aromatic hydrocarbon oil.

13. A method in accordance with claim 10 wherein a major portion of the emulsifiers and of the water are utilized in the formation of the emulsion of water and latex extender oil.

14. A method in accordance with claim 10 wherein substantially all of the emulsifiers and all of the water are utilized in the formation of the emulsion of water and latex extender oil.

15. A method in accordance with claim 10 wherein the styrene is included with the water, the latex extender oil and the emulsifying materials in the emulsion forming step.

16. A method in accordance with claim 10 wherein the reaction is carried out under emulsion polymerization conditions and for a time sufficient to produce a product having a Mooney value above about 140.

References Cited

UNITED STATES PATENTS

| | | | |
|---|---|---|---|
| 1,896,491 | 2/1923 | Luther et al. | 260—23.7 |
| 2,366,325 | 1/1945 | Fryling | 260—23 |
| 2,460,038 | 1/1949 | Serniuk | 260—23.7 |
| 2,476,819 | 7/1949 | Draman | 260—23.7 |
| 2,485,592 | 10/1949 | Griess et al. | 260—23 |
| 2,721,185 | 10/1955 | Schulze et al. | 260—5 |
| 2,839,483 | 6/1958 | Howland et al. | 260—23.7 |
| 2,955,096 | 10/1960 | White | 260—23.6 |
| 2,993,023 | 7/1961 | Pfau et al. | 260—33.2 |
| 3,157,608 | 11/1964 | McNay | 260—27 |
| 3,196,126 | 7/1965 | Wald | 260—33.6 |

DONALD E. CZAJA, *Primary Examiner.*

R. A. WHITE, *Assistant Examiner.*